Patented May 22, 1934

1,960,116

UNITED STATES PATENT OFFICE 1,960,116

METHOD OF PRODUCING MARBLE-LIKE OR CLOUDY AND OPAQUE EFFECTS IN RESINOUS CONDENSATION PRODUCTS

Karl Loos, Astoria, Long Island, N. Y.

No Drawing. Application August 31, 1929, Serial No. 389,868

8 Claims. (Cl. 106—22)

My invention relates to a method of producing marble-like or cloudy and opaque color effects in condensation products, whereby either a striated or a uniformly opaque effect is produced.

It is an object of the present invention to provide a novel method of producing marble-like, cloudy and opaque effects in resinous condensation products in a simple and inexpensive manner, and whereby products of low specific gravity and having beautiful and permanent striate and other color effects are obtained.

The production of marble-like or cloudy color effects in condensation products has heretofore been attained by adding filling or coloring materials of metallic or mineral nature, or oils, etc., which act as opacifying agents and produce more or less good effects depending on the skill of the workman and on the consistency of the condensation product. Opaque resinous products have also been produced by causing precipitation of barium compounds in the reacting mass; this process, however, because of the high specific gravity of barium compounds, yielded products which were likewise of high specific gravity.

I have found that such marble-like and other effects may be produced in the reacting mass under certain conditions by chemical precipitation. Such precipitation is preferably made to occur as the result of the double decomposition of an alkali metal compound, preferably of alkaline nature, with tartaric acid. In this manner a precipitate of an alkali metal bitartrate is produced. The alkali metal compound may be mixed with the original reacting substances (such as a phenol and an aldehyde) and the tartaric acid added to the mixture either during or at the end of the distillation of the water. The nature and extent of the opacification will depend upon the stage of the water distillation at which the tartaric acid is added; in general, if such acid is added toward the beginning of the distillation, the mass will be rendered uniformly opaque, while if such addition takes place toward, or at the end of the distillation, marble-like striations will be obtained as the precipitate then does not have time to become uniformly distributed throughout the mass.

In carrying out my novel process, a phenol and an aldehyde, such as phenol and formaldehyde, are condensed in the presence of an alkali metal compound, preferably of alkaline reaction, such as potassium carbonate or bicarbonate, and toward the end of the distillation of the water a strong solution of tartaric acid is added until the mass is substantially neutral, whereupon a white precipitate of potassium bitartrate is produced. If now the solvent (water or alcohol) of the tartaric acid is driven off and the finished condensation product poured into molds and hardened, there is obtained a mass having beautiful marble-like or cloudy effects due to such precipitate. By adding dissolved coloring materials to the mass, it is possible to obtain marble-like products of various colors, and by pouring together differently colored condensation products any desired mottled or varicolored effect can be obtained without difficulty. To produce completely opaque products, the acid is added to the mixture at, or approximately at, the beginning of the water distillation.

The following examples illustrate several modes of carrying out my invention, but it will be understood that these examples are given by way of illustration only and that my invention is not limited thereto.

*Example 1*

100 parts (by weight) of phenol,
100 parts (by weight) of formaldehyde (40%), and
1.2 parts (by weight) of potassium carbonate ($K_2CO_3$)

are condensed in known manner by heating under ordinary pressure for 1½ to 3 hours, depending upon the temperature employed. Heating for 1½ hours at approximately boiling temperature will give satisfactory results. The resinous condensation product so produced is then heated under vacuum to distill off the water of solution and of reaction, and when the temperature has risen to about 60° to 70° C., a solution of 1 part by weight of tartaric acid is added to neutralize the mixture, which is then further heated to the required consistency. The mass is then ready for pouring into molds, and after hardening, which may take place for 1 or 2 days with increasing temperature, yields articles having the desired marble-like appearance. If desired, various softening and other agents may be added to the mass before hardening.

Similar effects may be produced by employing potassium bicarbonate, or the corresponding sodium salts or borax, but I prefer to employ potassium carbonate or bicarbonate.

*Example 2*

100 parts of phenol,
80 parts of formaldehyde (40%), and
1 part of sodium bicarbonate, (all parts by weight)

are condensed by heating over a water or oil bath at approximately boiling temperature and at ordinary pressure for 1½ to 3 hours. Five parts by weight of glycerin are then added and the mass distilled under vacuum. When the temperature has risen to 80° C., 1.1 parts by weight of tartaric acid are added and the distillation continued until substantially all the volatile matter (water and the solvent for the acid, if other than water) has been driven off. After hardening in molds at about 80° C. for three days, the mass shows beautiful marble-like effects.

Example 3

100 parts phenol,
150 parts formaldehyde (40%), and
4 parts potassium bicarbonate, (all parts by weight)

are condensed on the water bath for about 2½ hours at 75° C., 10 parts of glycerin then added, and the volatile matter distilled off under vacuum. When the temperature reaches 50° C., 4 parts by weight of tartaric acid are added and the distillation continued to completion. After hardening in molds at about 80° C. for two to three days, uniformly opaque articles are obtained.

Coloring materials may be added to the resinous condensation product, say with the tartaric acid solution, to produce colored marble effects, or differently colored, dehydrated condensation products may be poured into the same mold to produce variegated effects.

Other variations may be resorted to within the scope of the appended claims without departing from the spirit of the invention. For example, the initial condensation product may be formed in the presence of tartaric acid and the alkali metal salt (such as the carbonate) subsequently added thereto, and the appended claims are to be construed as including the process wherein the carbonic acid salt or the base is added to the acid; or a mixture of a plurality of alkali metal salts may be used in place of a single salt.

I claim:

1. The method of producing opaque effects in phenol-formaldehyde condensation products, which comprises condensing phenol and formaldehyde in the presence of potassium carbonate, distilling off at least a portion of the water, adding tartaric acid until the mass is substantially neutral, whereby a precipitate of potassium acid tartrate is formed, and finally hardening the mass.

2. The method of producing opaque effects in phenol-formaldehyde condensation products, which comprises condensing phenol and formaldehyde in the presence of potassium carbonate, distilling off the water, adding tartaric acid until the mass is substantially neutral, whereby a water-insoluble precipitate of potassium bitartrate is formed, and finally hardening the resinous condensate with the precipitate remaining therein.

3. The method as set forth in claim 2 wherein the tartaric acid is added before the distillation of the water is complete and then continuing the distillation, whereby a substantially uniform distribution of the precipitate in the mass is obtained and an opaque mass produced.

4. A phenol-aldehyde condensation product having distributed at least partially therein a precipitate of potassium bitartrate formed in situ by double decomposition in the condensing mass.

5. The method of producing opaque effects in phenol-aldehyde condensation products, which comprises condensing a phenol and an aldehyde in the presence of a basic compound of potassium, distilling off the water, adding tartaric acid to the mass, whereby a precipitate of potassium acid tartrate in said mass is produced, and finally hardening the resinous condensate with the precipitate remaining therein.

6. The method of producing opaque effects in phenol-aldehyde condensation products, which comprises condensing a phenol and an aldehyde in the presence of a basic compound of potassium, distilling off the water, adding tartaric acid to the mass in quantity sufficient to neutralize said basic compound, whereby a precipitate of potassium acid tartrate in said mass is produced, and finally hardening the resinous condensate with the precipitate remaining therein.

7. The method as set forth in claim 5, wherein the tartaric acid is added before the distillation of the water is complete and then continuing the distillation, whereby a substantially uniform distribution of the precipitate in the mass is obtained and an opaque mass produced.

8. A phenol-formaldehyde condensation product having therein a precipitate of potassium bitartrate formed in situ by double decomposition in the condensing mass.

KARL LOOS.